United States Patent Office 3,526,264
Patented Sept. 1, 1970

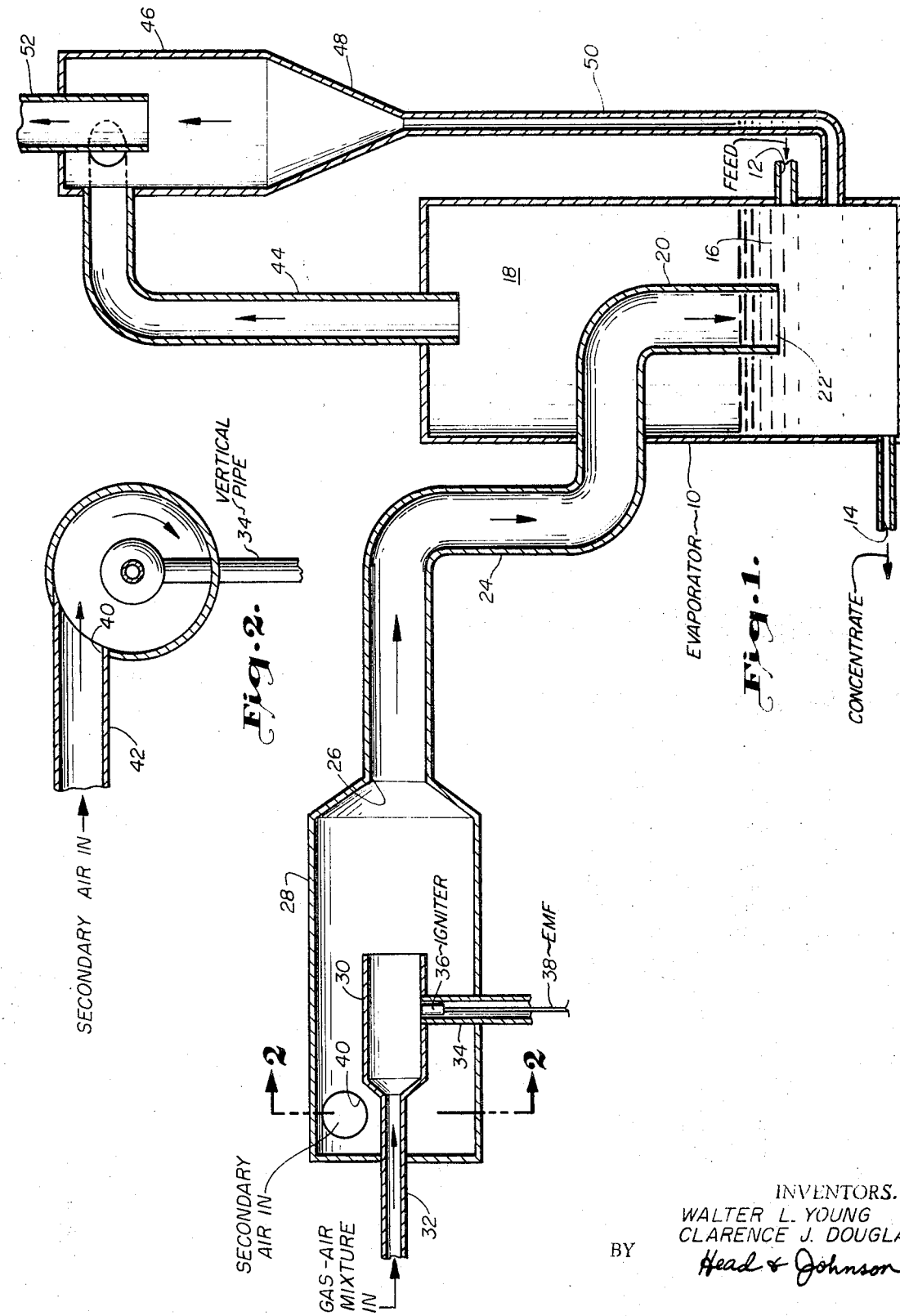

3,526,264
METHOD OF CONCENTRATING A MAGNESIUM CHLORIDE SOLUTION WITHOUT PRODUCING AN EXHAUST GAS PLUME
Walter L. Young and Clarence J. Douglas, Tulsa, Okla., assignors, by mesne assignments, to American Magnesium Company, Tulsa, Okla., a corporation of Delaware
Filed Dec. 26, 1967, Ser. No. 693,415
Int. Cl. B01d 1/14
U.S. Cl. 159—47                                       3 Claims

ABSTRACT OF THE DISCLOSURE

This invention relates to a method of efficiently concentrating a solution producing an exhaust gas plume. More particularly, the invention relates, in an exemplary application, to a method of efficiently concentrating a magnesium chloride solution without producing an exhaust gas plume including the steps of burning an air and gas mixture to produce hot combustion gases, controllably intermixing secondary air with said hot combustion gases to provide hot drying gases having a maximum temperature less than that at which, under the given environmental pressure the magnesium chloride has a vapor pressure of less than $1/10,000$ of an atmosphere, and injecting said hot drying gases directly into said magnesium chloride solution.

CROSS-REFERENCE

The application is not related to any existing United States or foreign patent application.

SUMMARY

While the invention is broadly directed to the concentration of solutions it will be described, by way of example, as it is particularly applied to the concentration of a magnesium chloride solution.

One method of manufacturing magnesium metal is by the electrolysis process wherein a concentrated magnesium chloride solution is fed into an electrolysis cell. One of the best sources of magnesium chloride is in dilute solution form, such as sea water or water from brime wells. In order to concentrate these dilute solutions they must be heated to evaporate most of the water therefrom. It can be appreciated that substantial quantities of heat are required and therefore economy of operation requires that evaporation be undertaken in an arrangement achieving the most efficient utilization of heat.

A known method of heating fluids which achieves a high rate of efficiency is submerged combustion. In this type of heating the hot gases are directed directly into the solution. The typical arrangement includes a dip pipe extending below the surface of the liquid by which the hot drying gases are discharged into the liquid. The drying gases pass downwardly and then back upwardly in the solution and in the process exchange heat with the solution. The exhaust gases pass out of the evaporator container and after undergoing some type of separation pass to an exhaust stack and are discharged into the atmosphere.

A problem that has existed with systems wherein drying gases are directed into a magnesium chloride solution is that the exhaust gases create an undesirable aerosol plume. Such plumes do not quickly disburse in the atmosphere and are highly objectionable from the standpoint of air polution.

This invention provides a process of dehydrating solutions, such as a magnesium chloride solution in an arrangement wherein heated drying gases are introduced directly into the solution without the production of an air contaminating exhaust plume.

DESCRIPTION OF VIEWS

FIG. 1 is a diagrammatic arrangement of process equipment shown in the relationship for practicing the method of the invention.

FIG. 2 is a cross-sectional view of the combustion chamber taken along the line 2—2 of FIG. 1.

DETAILED DESCRIPTION

The invention will be described as it particularly relates to the evaporation of a magnesium chloride solution as a specific example of the application of the invention.

Referring to the drawing, a magnesium chloride solution to be concentrated is contained in an evaporator vessel 10 which includes a dilute solution inlet 12 and a concentrated solution outlet 14. The level of the magnesium chloride solution 16 is maintained at a preselected height providing in the vessel 10 a vapor area 18 above the solution level. Hot drying gases are injected directly into the solution 16 by means of a dip pipe 20 which extends vertically downwardly within the interior of the vessel 10, and preferably substantially axially of the vessel. The hot drying gases are discharged out the open end 22 of the dip pipe 20 and into direct contact with the solution 16. The exhaust gases pass upwardly out of the solution 16 and into the vapor area 18.

Dip pipe 20 is connected by means of a gas conduit 24, which enters the side of vessel 10, to the outlet 26 of a combustion chamber 28. The combustion chamber 28 is preferably of cylindrical internal configuration and has positioned therein a burner 30. The burner 30 is preferably mounted coaxially of the combustion chamber. Burner 30 has connected to it at the rearward end thereof a velocity tube 32 by which an air and gas mixture is injected into the burner. Velocity tube 32 is dimensioned so as to provide a velocity of air and gas mixture travel sufficient to prevent combustion traveling rearwardly in the tube.

An opening in one side of the burner 30 receives an igniter tube 34 having an igniter element 36 therein. Conductors 38 extend to a voltage source (not shown) providing means whereby the igniter element 36 may be energized to give an initial flame ignition in burner 30.

Intersecting the combustion chamber 28, preferably tangentially to the cylindrical interior surface thereof, is a secondary air inlet opening 40 having a secondary air conduit 42 extending therefrom (see FIG. 2). The secondary air conduit 42 extends to an air compressor (not shown) by which secondary air is forced into the combustion chamber 28. Secondary air introduced tangentially flows around the interior of the combustion chamber 28 as it mixes with the hot gases of combustion from burner 30 so as to reduce the skin temperature of combustion chamber 28. The combination of the secondary air with the combustion gases from burner 30 produces drying gases which pass through gas conduit 24 and dip pipe 20 into the solution 16.

The hot drying gases pass downward directly into solution 16 wherein substantially all of the heat is transferred to the solution. The drying gases then pass upwardly out of the solution and into the vapor area 18 of the evaporation vessel 10. Exhaust gases pass out of the evaporator vessel 10 through exhaust conduit 44 and may be passed directly to a stack for dissipation in the atmosphere. In the preferred arrangement however the exhaust conduit passes into a separation unit wherein entrained solution may be extracted. In the illustrated arrangement the separation unit includes a cyclone separator 46. Exhaust conduit 44 communicates with the separator 46 preferably tangentially to the cylindrical interior surface so that the gas whirls circularly in the separator causing the entrained solution to be ejected out of the gas stream and fed downwardly into the tapered lower portion 48 of the cyclone separator. A return line 50 returns the extracted components of the exhaust gas from separator 46 back into solution 16 in vessel 18.

An exhaust stack conduit 52 extends from the upper end of the cylone separator. Preferably the exhaust stack conduit 52 extends downwardly a distance within and coaxially of the separator 46 to function as a vortex finder. Gases pass out of cyclone separator 46 through the exhaust stack conduit 52 which communicates to an exhaust stack (not shown).

In the normal operation of submerged combustion systems wherein the combustion takes place below the surface of the magnesium chloride solution 16 and the combustion gases pass in direct contact with the solution, an air contaminating plume has been experienced as the exhaust gases pass out of the exhaust stack. By the arrangement of this invention the temperature of the drying gases is controlled such that the plume normally associated with dehydration of a magnesium chloride solution is substantially completely eliminated.

In pilot test conducted to produce $MgCl_2 \cdot 6H_2O$ from brine containing in its natural state, approximately 11.3% magnesium chloride, concentration was carried out in a 15" diameter stainless steel tank. Fuel gas was injected at a rate of 2.94 s.c.f.m. (standard cubic feet per minute) with a combustion air rate of 34.6 s.c.f.m. Secondary cooling air was injected at 12¾" water pressure at a rate of 116 s.c.f.m. This combination produced drying gases at 935° F. In 345 minutes of run in this test 456.5 pounds of water was evaporated from the magnesium chloride solution. The solution temperature during evaporation was 170° F. and the temperature of the stack gases was 192° F. No visible plume was produced at the exhaust stack under such operating conditions. Additional tests indicated that no visible plume was observed with drying gases having temperatures of 1265° F. As the temperature of the drying gas was increased above this level, a plume became visible and with drying gas at a temperature of 1465° the exhaust gas plume was clearly visible.

Thus it has been discovered that a plume resulting from the dehydration of $MgCl_2$ can be eliminated if the drying gases are maintained at a temperature such that under given environmental pressures the vapor pressure of the $MgCl_2$ is less than approximately $1/10,000$ of an atmosphere. Normally dehydration of $MgCl_2$ solutions cannot economically be carried out at pressures substantially greater than atmospheric pressure utilizing the method of this invention. Therefore drying gas temperatures not greater than approximately 1265° F. produce economical and efficient dehydration of $MgCl_2$ solutions without producing an objectionable exhaust plume.

The invention may be applied to the concentration of any solution which tends to produce an exhaust gas plume. By selectably intermixing secondary air so as to control the drying gas temperature to a level which does not raise the vapor pressure of the plume producing constituent more than about $1/10,000$ of an atmosphere the production of an exhaust gas plume may be eliminated.

While the invention has been described with a certain degree of particularity it is manifest that many changes may be made in the details of construction, the arrangement of components, and the sequence of steps disclosed herein without departing from the spirit and scope of the invention. It is understood that the invention is not to be limited to the abstract, nor the summary herein, nor to the exemplified embodiment described for purposes of illustrating one application of the invention, but the invention is to be limited only by the scope of the appended claim or claims, including the full range of equivalence to which each element or steps thereof is entitled.

What is claimed:
1. A method of concentrating a magnesium chloride solution without producing an exhaust gas plume comprising:
    burning an air and gas mixture to produce hot combustion gases;
    controllably intermixing secondary air with said hot combustion gases to provide hot drying gases having a maximum temperature such that under the given environmental pressures the vapor pressure of magnesium chloride is less than about $1/10,000$ of an atmosphere; and
    injecting said hot drying gases directly into said magnesium chloride solution.

2. A method of concentrating a magnesium chloride solution without producing an exhaust gas plume comprising the steps of:
  (a) burning an air and gas mixture by means of a burner position axially in a cylindrical combustion chamber to produce hot combustion gases;
  (b) controllably interjecting tangentially into the cylindrical combustion chamber secondary air, said secondary air mixing with said combustion gases to provide hot drying gases having a preselected temperature;
  (c) flowing dilute magnesium chloride solution into an evaporation chamber to maintain a pool of magnesium chloride solution in the evaporation chamber;
  (d) discharging hot drying gases from the combustion chamber through a dip pipe into the pool of magnesium chloride solution to evaporate at least a portion of the solution, the said preselected temperature of said hot drying gases of step (b) being such that under the given environmental pressures of said pool of magnesium chloride solution the vapor pressure of magnesium chloride is less than about $1/10,000$ of an atmosphere;
  (e) discharging gas passing off the pool of the solution out of the evaporation chamber and to the atmosphere; and
  (f) flowing concentrated magnesium chloride solution out of the evaporation chamber pool.

3. A method of concentrating a magnesium chloride solution according to claim 2 including the steps of:
  (g) discharging the gas passing off the pool of solution into a cyclonic separator wherein solid and liquid portions carried by the gas are separated;
  (h) discharging the gas passing out of the cyclonic separator to the atmosphere; and
  (i) passing the solid and liquid portions separated in said cyclonic separator to said pool of magnesium chloride solution in the evaporation chamber.

References Cited
UNITED STATES PATENTS

| | | | |
|---|---|---|---|
| 2,787,318 | 4/1957 | Wolferspriger | 126—360 X |
| 2,904,417 | 9/1959 | Nuyl | 431—9 |
| 3,266,557 | 8/1966 | Mustian et al. | 159—47 X |
| 3,276,510 | 10/1967 | Austin et al. | 159—47 X |
| 3,317,306 | 5/1967 | Getsinger et al. | |
| 2,325,566 | 7/1943 | Wiley et al. | 23—307 |
| 2,522,475 | 9/1950 | Walker. | |
| 3,316,061 | 4/1967 | Csendes et al. | 159—47 X |

FOREIGN PATENTS

| | | |
|---|---|---|
| 1,081,894 | 9/1967 | Great Britain. |

OTHER REFERENCES
"Physical Chemistry" by Walter J. Moore, Prentice Hall, 3rd edition, pp. 138, 139.

NORMAN YUDKOFF, Primary Examiner

J. SOFER, Assistant Examiner

U.S. Cl. X.R.

159—16; 23—307